Jan. 16, 1962  J. T. DUANE  3,017,562

ALTERNATOR CONTROL SYSTEM

Filed May 29, 1958

Inventor
James T. Duane
by David P. Ogden
His Attorney 3,017,562
     ALTERNATOR CONTROL SYSTEM
James T. Duane, Erie, Pa., assignor to General Electric
   Company, a corporation of New York
        Filed May 29, 1958, Ser. No. 738,834
              8 Claims.  (Cl. 322—46)

My invention relates to an alternator generator and, more particularly, to a dynamoelectric machine having an inductor rotor energized magnetically by direct current field windings supported in the stator and an alternating current winding on the stator which may have its output rectified to provide a direct current suitable for a direct current load and for energizing the direct current windings.

The supply of direct current electrical power in modern high altitude aircraft is complicated by the effects of severe environmental conditions on the commutators and brushes historically used in direct current generators. In some cases, it is possible to obtain direct current power from an airplane's alternating current supply by means of conventional transformer rectifier assemblies, but this may be impractical due to limited capacity of available alternating current supplies or due to problems introduced by the electrical interaction between the alternating current and direct current systems.

When a separate direct current generating system is deemed essential it is desirable to eliminate not only the commutator brush combination usually used in conventional direct current generators, but also the need for any other sliding contacts such as slip ring and brush assemblies. In addition, the usual requirement for a constant controlled unidirectional output voltage makes it necessary to minimize the amount of controlled direct current excitation power which must be supplied and controlled by precision regulating equipment. It is often also necessary to construct generators with specific, pre-selected characteristics of excitation power required as a function of generator load. Moreover, frequently such generators are required to supply a direct voltage signal proportional to load current for an input signal to control equipment regulating the distribution of load between several paralleled generators.

General requirements for all aircraft generating equipment include a maximum of reliability and ease of maintainability with minimum weight construction. It is particularly desirable to minimize the number of sensitive, electrical components such as insulated windings and rectifiers which must be installed on the rotating portion of the generator where they will be subjected to high centrifugal stresses and severe rotational vibration.

Therefore, an object of my invention is to provide a brushless direct current generator having no rotating electric current carrying components.

A further object of my invention is to provide a compound alternator.

A further object of my invention is to provide an alternator requiring a minimum amount of regulation power.

Briefly, in accordance with one aspect of my invention, an inductor alternator generator having a high permeability inductor rotor is energized by direct current excitation windings non-rotatably supported on the stator. An alternating output or load winding is positioned in the stator adjacent to the rotor to be energized by the rotating field produced thereby. The output induced in the alternating current winding by the direct current excitation winding is passed through rectifiers to energize the direct current windings thereby providing a self-excited machine. To provide a machine with compound characteristics, a direct current winding is provided and connected to carry a current proportional to the load current and the other direct current winding is connected to carry a current proportional to the output voltage across the rectifiers.

The subject matter which I regard as my invention is particularly pointed out and distinctly claimed in the concluding portion of this specification. My invention, however, as to its organization and method of operation together with further objects and advantages thereof will best be understood by reference to the following description taken in connection with the accompanying drawing, in which:

Figure 1:
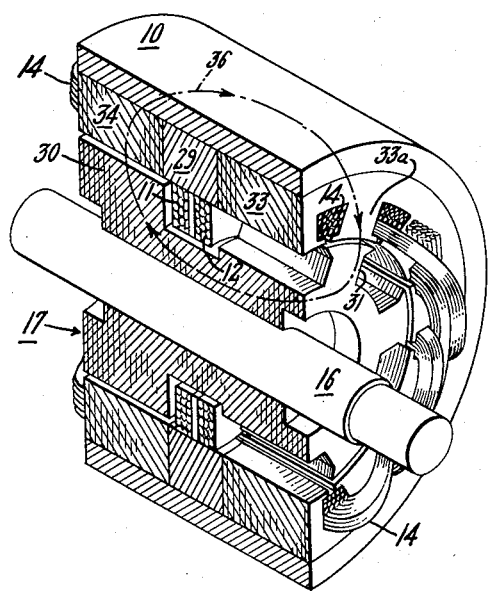
FIG. 1 shows a perspective view partially broken away of an inductor alternator adapted to utilize my invention.

Referring now to the drawing in which similar numbers designate similar parts, I have shown in FIG. 1 a brushless inductor alternator generator having a stator 10 supporting two direct current field windings 11 and 12 positioned adjacent each other and coaxial with a rotor shaft 16, and an alternating current winding 14. Rotor shaft 16 has mounted thereon a salient pole type high permeability inductor rotor 17.

As will be discussed in more detail below, excitation of the windings 11 or 12 during concurrent rotation of the rotor 17 will induce an alternate voltage in the winding 14 in a manner well known in the alternator art.

Figure 2:
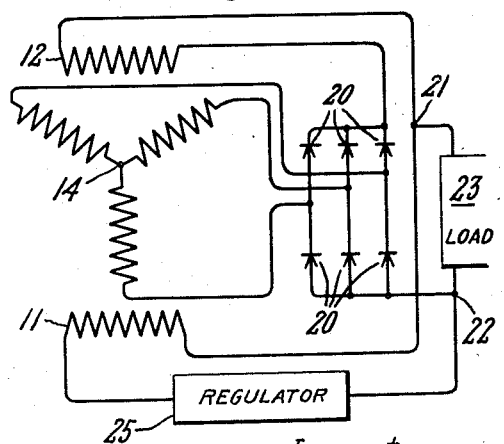
FIG. 2 is a schematic drawing of the circuit connections according to my invention.

Referring now to FIG. 2, I have shown the direct current field windings 11 and 12 positioned to energize the 3-phase alternating current winding 14. The output of the 3-phase winding 14 passes through the plurality of rectifiers 20 to provide a direct current output voltage across the power terminals 21 and 22. This unidirectional output voltage will drive a direct current load 23.

According to one aspect of my invention, the direct current excitation winding 11 is connected across the power terminals 21 and 22 to be energized by the unidirectional current output of the rectifiers 20 similar in function to the usual shunt winding of a more conventional direct current machine. Also, the winding 12 is connected directly in or through current sensing means to one of the power output lines to carry the unidirectional current proportional to load current. As shown, winding 12 is connected in series with the load terminal 21. By placing the rectifiers 20 in circuit with the generator output, the winding 12 is excited in a manner similar to the usual series winding of a more conventional direct current machine.

From the foregoing, it will become apparent to those skilled in the art that the use of both series and shunt direct current excitation windings 11 and 12 may be used to provide compound motor characteristics in the alternator of my invention. In other words, the shunt field excitation winding 11 may be connected in circuit with a regulator 25 which will control the output voltage of the alternator in some desired manner while the direct current excitation winding 12 may be connected electrically as an armature reaction compensating winding similar to a conventional use of such a winding in a compound direct current generator. In this regard, the two windings 11 and 12 function magnetically in a manner similar to that usually accorded the rotating direct current field winding of a conventional alternator. Moreover, in some applications where it is desirable to reduce further the power of the regulator 25, it is feasible to divide the winding 11 into two or more portions with only one portion being controlled by the regulator 25 to have an independently controlled influence on the flux within the machine and the other portion connected to be energized from the terminal 21—22 or a constant voltage source such as a battery which might be a part of the load 23. However, the details of such excitation arrangements are known in the art and need not be discussed here.

In addition to the above normal functions of the windings 11 and 12, the winding 12 provides an additional feature of considerable value. Since the output voltage of the rectifiers 20 is a fluctuating direct current, the addition of the series field winding 12 will cause a reduction of these fluctuations by functioning as a smoothing reactor. This will at least partially reduce and in some applications may eliminate the need for any additional smoothing reactor being placed in circuit with the load.

According to one aspect of my invention as shown in FIG. 1, in order to eliminate brushes, commutators and any rotating electrical elements, the windings 11 and 12 are positioned on the stator and do not rotate. These field windings 11 and 12 are non-rotatably secured to the stator 10 to provide an excitation for the rotor 17. In the particular structure of my invention illustrated, cooling of the windings 11 and 12 must be considered. In order to provide sufficient heat dissipation for the windings 11 and 12 with their outer diameter being less than that inner diameter of the winding 14, I prefer to place a non-magnetic thermally conductive annular member 29 between the stator 10 and the windings 11 and 12 to reduce the temperature gradient therebetween. This member 29 may consist of aluminum laminae having a diametric cross-section similar to the laminae defining the pole members 33 and 34. The use of a permeable metal in the space occupied by the member 29 would tend to shunt a portion of the excitation flux to prevent its passing through the individual pole members 33 and 34.

In order to produce a varying flux in the winding 14, the air gap surface of the rotor 17 must be other than smooth. By the addition to the rotor 17 of the laminated high permeability flux concentrating pole pieces 30 and 31, the flux passing through the winding 14 is caused to fluctuate between maximum positive and negative values. In FIG. 1, the rotor 17 is shown with the pole piece 30 (in section) directly under the winding 14 (pole member 34 in section). In the particular construction illustrated, in FIG. 1, the winding 14 extends the full length of the stator and encompasses two laminated flux carrying pole members 33 and 34.

Assuming a clockwise flux flow around the direct current excitation windings 11 and 12, the flux 36 as shown in FIG. 1 will be flowing from the rotor 17 through the pole piece 30 to the stator 10 by way of the pole member 34 to energize the stator winding 14. It is easily seen that the pole pieces 33 and 34 are displaced relative to each other by 180 electrical degrees. Because of the much larger air gap between the pole member 33 and the pole piece 31, flux in the pole member 33 will be very small when the pole piece 30 is centered (as shown) under the pole member 34. At the particular position of the rotor 17 illustrated, the pole piece 31 is under a pole member 33a which is adjacent to the pole member 33 and thus the path of the excitation flux 36 produced by the windings 11 and 12 is completed.

When the rotor 17 has been rotated 180 electrical degrees, the pole piece 31 will be directly under the pole member 33 of the stator alternating current winding 14 and the flux flowing clockwise in the rotor 17 will now flow from the stator 10 through the pole member 33 to the pole piece 31 of the rotor to energize the winding 14 and induce therein a voltage of an equal and opposite polarity.

Obviously, the frequency of the alternating current in the winding 14 will depend on the speed of rotation of the rotor 17. Similarly, the magnitude of the voltage in the winding 14 will depend on the ampere turns of the two excitation windings 11 and 12 minus the losses caused by armature reaction. The above magnetic phenomena will be readily understood by those skilled in the inductor alternator art. Further discussion of the operation of an inductor alternator may be found in the Letters Patent 2,013,052 issued to L. A. March on June 2, 1936, and assigned to the assignee of the present application.

It is generally accepted to be better practice in the design of an inductor alternator to provide a stator construction that is magnetically smooth. In other words, usually each of the pole members 33 and 34 would consist of several magnetic pieces encompassed by a coil of the winding 14 with an overlapping coil of the winding 14 encompassing certain of these pieces and a second overlapping coil encompassing other of these pieces. Such a construction is shown and described in detail in the above mentioned March patent. Thus, the magnetic path and the inductance of the machine will not vary as a function of the rotor position. Because of the added complications of a theoretical discussion of these overlapping windings allowing the provision of a "smooth" stator and the fact that details of this construction are not a portion of my invention, I have simplified the drawing of FIG. 1 to show separate and distinct pole members 33, 33a and 34.

Figure 3:
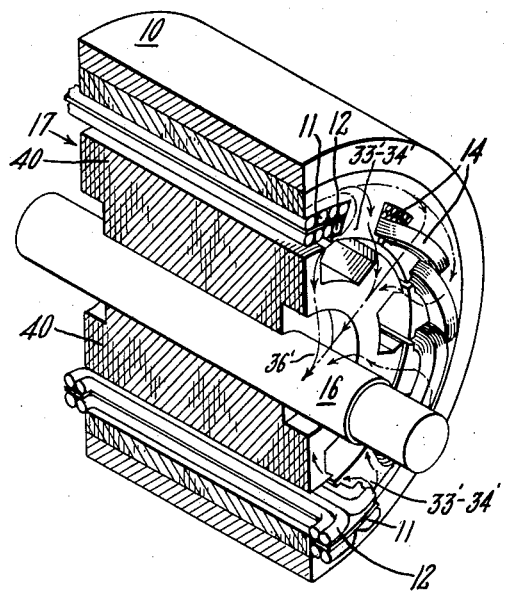
FIG. 3 shows a perspective view partially broken away of another inductor alternator adapted to utilize my invention.
Figure 4:
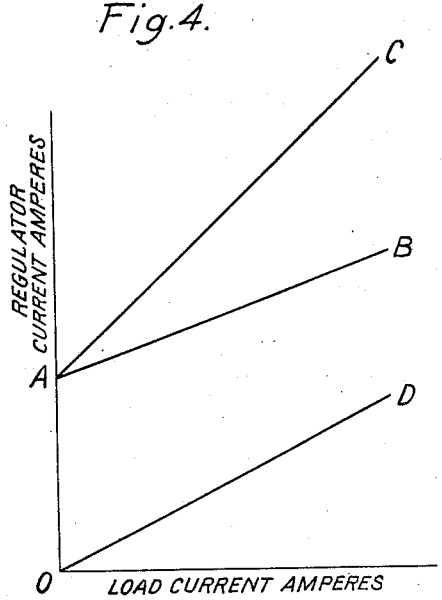
FIG. 4 is a curve showing one set of current characteristics obtainable from the generator of my invention.

Referring now to FIG. 3, I have shown a slightly different type of alternator suitable for utilizing my invention. As shown and discussed above with regard to FIG. 1, the direct current excitation windings are secured to the stator 10 and the rotor 17 supports no current carrying components. However, the alternating current stator windings 14, shown in FIG. 4, are placed on the flux carrying pole members 33'—34' which include flux carrying punchings extending the full length of the stator.

The direct current windings 11 and 12 pass through a longitudinal slot in the stator punchings with the end turns being equally divided between the two halves of the stator to balance the excitation system much like a homopolar machine. In FIG. 3, the direct current excitation windings induce flux excursion diametrically across the rotor. Thus, the flux may be shown by the lines 36'. According to this modification of my invention, the poles or flux concentrating members 40 of the rotor extend the entire length of the rotor. The combination of excitation of the windings 11 and 12 and rotation of the teeth 40 will produce a variation of the flux flow within the stator pole members 33'—34' resulting in an alternating current being induced in the alternating current winding 14 which is equivalent to that discussed above in connection with FIG. 2.

According to my invention, rectifiers 20 are connected in circuit with the output of the alternating current winding 14 to provide the direct current load 23 with a source of power. Since I have placed the rectifiers 20 in the circuit, I am able to obtain several important advantages.

Perhaps the most important advantage is the connection of the winding 12 to carry a current equal to the load current, to provide an excitation which may be designed to compensate for any variation caused by armature reaction and to provide a smoothing reaction without adding any weight to the machine. Winding 12 may be termed a demagnetization compensating winding. Moreover, the rectifiers 20 allow me to provide self-excitation of a shunt field winding 11 in the alternator. This obviously eliminates the need for providing a separate source of unidirectional power for exciting the alternator. Usually the shunt field excitation will be externally controlled by the regulator 25 to provide desired regulation as dictated by the particular load 23. With a portion of the excitation being furnished by the series field, the total maximum current rating of the regulator 25 may be reduced. The current rating of the regulator 25 may be further reduced by providing the shunt coil 11 with two portions, one of which might be separately excited as a reference winding and the other of which might be controlled by the regulator.

In addition, the basic problem of high altitude commutating and brush wear may be eliminated by the physical location of the unidirectional excitation field windings 11 and 12 being secured to the stator 10.

With regard to the particular regulator 25, the details of its design are not a portion of this invention and the regulator will not be described herein. However, by proper selection of the turns ratio of the two windings 11 and 12, the voltage-current characteristics of my invention may be adapted to operate with an existing regulator 25. Although in view of the above discussion this may seem obvious to those skilled in the art, the freedom it gives to the generator design engineer is of substantial importance.

For instance, in FIG. 4, I have shown typical characteristics obtainable with my inductor alternator. In FIG. 4, where the scale of the abscissa is in load current amperes and the scale of the ordinates is in regulator current (excitation field winding current) in amperes, one design of my invention required the regulation control characteristics shown by the curve AB. However, with the armature reaction, load demagnitization effects, etc., of the particular machine used (which were made necessary by the requirements of very light weight), the excitation necessary to obtain an output voltage sufficient to cause the shunt field excitation to follow the line AB is shown by the line AC. With the compound arrangement of my invention, it becomes a simple matter to provide ampere turns in the excitation field winding 12 which will follow the line OD since this is directly proportional to the load current. Thus, the complete excitation may be computed by adding OD series excitation to AB controlled shunt excitation in the design submitted to the customer. This vectoral addition equals AC, the desired total excitation of the generator to provide the necessary output characteristics.

While I have shown and described particular embodiments of my invention, other modifications will occur to those skilled in the art. For instance, the alternating current winding 14 could be part of a single phase, 5-phase, or some other phase winding without departing from the true spirit and scope of my invention. Therefore, I intend by the appended claims to cover all such modifications.

What I claim as new and desire to secure by Letters Patent of the United States is:

1. An inductor alternator arrangement for producing a regulated unidirectional voltage comprising a stator member having a main excitation winding thereon for producing magnetic flux in said stator upon excitation thereof, load windings on said stator member adapted to have alternating current induced therein upon variations in the magnetic flux in said stator, a rotor member mounted on a rotatable shaft within said stator member for causing cyclic variations in the magnetic flux in said stator member upon rotation of said shaft, the alternating voltage induced in said load windings being applied to rectifier means to produce a unidirectional output voltage for application to a direct current load, a stator demagnetization compensating winding on said stator member arranged to be connected in series circuit with said rectifier means and the load whereby rectified load current is carried by said compensating winding and is effective to produce a magnetizing effect on said stator proportional to the rectified load current to thereby decrease the excitation power requirements of said main excitation winding in producing the regulated unidirectional voltage.

2. An inductor alternator arrangement for producing a regulated unidirectional voltage comprising a stator member having a main excitation winding thereon for producing magnetic flux in said stator upon excitation thereof, load windings on said stator member adapted to have alternating current induced therein upon variations in the magnetic flux in said stator, a rotor member mounted on a rotatable shaft within said stator member for causing cyclic variations in the magnetic flux in said stator member upon rotation of said shaft, the alternating voltage induced in said load windings being applied to rectifier means to produce a unidirectional output voltage for application to a direct current load, means for exciting said main excitation winding in proportion to the load voltage, a stator demagnetization compensating winding on said stator member arranged to be connected in series circuit with said rectifier means and the load whereby rectified load current is carried by said compensating winding and is effective to produce a magnetizing effect on said stator proportional to the rectified load current to thereby decrease the excitation power requirements of said main excitation winding in producing the regulated unidirectional voltage.

3. An inductor alternator arrangement for producing a regulated unidirectional voltage comprising a stator member having a main excitation winding thereon for producing magnetic flux in said stator upon excitation thereof, load windings on said stator member adapted to have alternating current induced therein upon variations in the magnetic flux in said stator, a rotor member mounted on a rotatable shaft within said stator member for causing cyclic variations in the magnetic flux in said stator member upon rotation of said shaft, the alternating voltage induced in said load windings being applied to rectifier means to produce a unidirectional output voltage for application to a direct current load, a stator demagnetization compensating winding on said stator member, said compensating winding being adjacently positioned with said main excitation winding so that the flux produced by said windings is cumulative, said compensating winding arrangement to be connected in series circuit with said rectifier means and the load whereby rectified load current is carried by said compensating winding and is effective to produce a magnetizing effect on said stator proportional to the rectified load current to thereby decrease the excitation power requirements of said main excitation winding in producing the regulated unidirectional voltage.

4. The arrangement of claim 3 wherein said compensation and said excitation windings are coaxial with the rotor shaft and with each other.

5. The arrangement of claim 3 wherein said compensation and said excitation windings are commonly contained in slots in said stator.

6. The arrangement of claim 3 wherein the coil sides of all three of said windings are in substantially parallel stator slots.

7. An inductor alternator for producing a unidirectional voltage comprising a stator member having first and second direct current excitation windings thereon for producing magnetic flux in said stator member when current flows therethrough, load windings on said stator members adapted to have alternating current induced therein upon variations in the magnetic flux in said stator, a rotor member mounted on a rotatable shaft within said stator member for causing cyclic variations in the magnetic flux in said stator member upon rotation of said shaft, the alternating voltage induced in said load windings being applied to rectifier means to produce a unidirectional output voltage, said first and said second excitation windings being adjacently positioned and coaxial with respect to each other and the rotor axis, means for energizing said first excitation winding, said second excitation winding arranged to be connected in series circuit with said rectifier means and a load whereby rectified load current is carried by said second winding and effective to produce magnetic flux in said stator member to modify flux produced by current in said first winding.

8. An inductor alternator for producing a unidirectional voltage comprising a stator member having first and second direct current excitation windings thereon for producing magnetic flux in said stator member when current flows therethrough, load windings on said stator members adapted to have alternating current induced therein upon variations in the magnetic flux in said stator, a rotor member mounted on a rotatable shaft within said stator member for causing cyclic variations in the magnetic flux in said stator, member upon rotation of said shaft, the alternating voltage induced in said load windings being applied to rectifier means to produce a unidirectional output voltage, said first and second excitation windings and said load windings having substantially parallel coil sides in substantially parallel slots in said stator, means for energizing said first excitation winding, said second excitation winding arranged to be connected in series circuit with said rectifier means and a load whereby rectified load current is carried by said second winding and effective to produce magnetic flux in said stator member to modify flux produced by current in said first excitation winding.

References Cited in the file of this patent

UNITED STATES PATENTS

| | | |
|---|---|---|
| 2,134,880 | McDowell et al. | Nov. 1, 1938 |
| 2,454,581 | Thomas | Nov. 23, 1948 |
| 2,519,650 | Hamilton | Aug. 22, 1950 |
| 2,525,486 | Harding et al. | Oct. 10, 1950 |
| 2,540,202 | Haas | Feb. 6, 1951 |
| 2,564,320 | Brainard | Aug. 14, 1951 |
| 2,767,368 | Kober | Oct. 16, 1956 |
| 2,809,301 | Short | Oct. 8, 1957 |

UNITED STATES PATENT OFFICE
CERTIFICATE OF CORRECTION

Patent No. 3,017,562 January 16, 1962

James T. Duane

It is hereby certified that error appears in the above numbered patent requiring correction and that the said Letters Patent should read as corrected below.

Column 6, line 37, for "arrangement" read -- arranged --; column 7, line 8, after "stator" strike out the comma.

Signed and sealed this 1st day of May 1962.

(SEAL)
Attest:

ERNEST W. SWIDER
Attesting Officer

DAVID L. LADD
Commissioner of Patents